Patented June 15, 1954

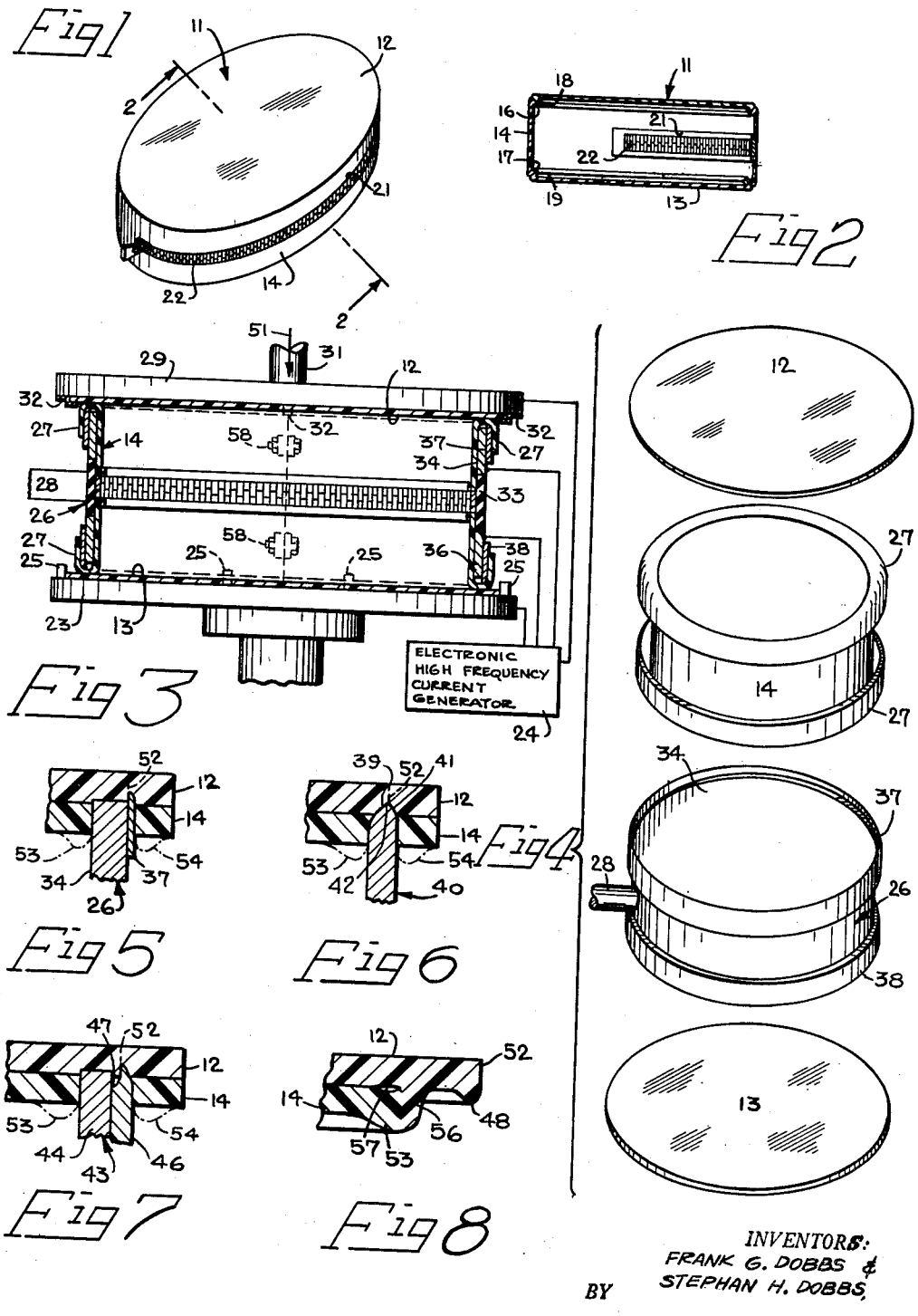

2,681,296

UNITED STATES PATENT OFFICE 2,681,296

MANUFACTURE OF SEALED ENCLOSURES

Frank G. Dobbs and Stephan H. Dobbs,
New York, N. Y.

Application August 13, 1951, Serial No. 241,618

4 Claims. (Cl. 154—125)

The invention relates to enclosures, and relates more particularly to sealed receptacles, made of flexible sheet material, such as purses, luggage, and the like, and to the manufacture thereof.

The invention has among its objects the provision of sealed receptacles that may be made simply and inexpensively, and of methods used for the manufacture thereof.

With the above and other objects of the invention in view, the invention consists in the novel methods, as set forth in the claims hereof, and described in the specification.

In the accompanying drawings,

Fig. 1 is a perspective view of a finished receptacle, in accordance with an embodiment of the invention;

Fig. 2 is a sectional view taken on line 2—2 of Fig. 1;

Fig. 3 is a sectional view, similar to Fig. 2, illustrating the manufacture of a receptacle of the preceding views, but showing the same in a semi-finished state;

Fig. 4 is an extended perspective view, of the receptacle parts and the tool shown in Fig. 3;

Fig. 5 is a fragmentary sectional view, on an enlarged scale, illustrating the tool shown in Figs. 3 and 4 penetrating into the receptacle material;

Fig. 6 is a fragmentary sectional view, similar to Fig. 5, but showing a modified tool;

Fig. 7 is a sectional view similar to Figs. 5 and 6, but showing a further modified tool; and Fig. 8 is a fragmentary sectional view showing, on the scale of Figs. 5-7, the edge of a finished receptacle that was operated on by the tool illustrated in Fig. 7.

In Figs. 1 and 2 there is shown a sealed enclosure structure such as a receptacle 11. The receptacle 11 is shown to be of cylindrical shape.

The receptacle 11 has a top wall 12, a bottom wall 13 that is parallel thereto, and an endless intermediate cylindrical side wall 14. The side wall 14 has upper edges 16 and lower edges 17; the upper edges 16 are sealed to the edges 18 of the top wall 12, and the lower edges 17 are sealed to the edges 19 of the bottom wall 13. These edges all project on the interior of the receptacle 11.

The material of the walls 12, 13 and 14 is thin and flexible sheet material, and is preferably composed either of thermoplastic substance, or of a substance that has otherwise also thermoplastic surface characteristics, for instance due to coating or other treatment for that purpose. The sealing, as will be explained in detail later on, is preferably carried out by heat, and in a preferred embodiment by electronic high frequency heat fusing.

As best shown in Figs. 1-3, the side wall 14 is provided with a horizontal aperture 21 that may be opened and closed by a slide fastener 22. The aperture 21 and the slide fastener 22 extend throughout a large portion of the circumference of the side wall 14, in order to enable turning inside-out of the receptacle 11. During manufacture, the edges 16, 17, 18 and 19 of the receptacle project on the exterior thereof and the receptacle is later on reversed to place the edges on the interior.

The assembling of parts for the manufacture of the receptacle is illustrated in Figs. 3 and 4. The bottom wall 13 is placed on a platen 23 that is conductive and is insulated on an insulating support and is interconnected to a generator 24 for electronic high frequency current. Guides 25 may be provided to position the bottom wall 13 on the platen 23.

The side wall 14 is mounted on an annular tool 26 in such a manner that its end portions 27 are bent over the upper and lower contours of the tool 26 extending on the outside of said tool. The side wall 14 adheres to the tool 26 owing to this bending of its end portions 27. The tool 26 is movable to and from the platen 23 either manually, or by means of a guiding and positioning element 28 that is attached to the exterior of the tool at a location that avoids interference with the mounting of the side wall 14 on the tool 26.

After the bottom wall 13 has been positioned onto the upper surface of the platen 23 within the orbit of the guides 25, and the wall 14 has been mounted on the tool 26, the tool is lowered, until the side wall 14 is supported by the bottom wall 13 resting on the platen 23. Thereafter, the top wall 12 is placed over the top of the side wall 14, and a conductive plate 29 is superposed thereon. The plate 29 is movable relative to the platen 23, for instance by guide means comprising a guide 31, and is electrically interconnected to the generator 24.

The top wall 12 may either be placed directly onto the side wall 14, or instead may be positioned on and carried by the under surface of the plate 29, for instance by means of brackets 32.

The tool 26, as best shown in Fig. 3, comprises a center section 33 that is preferably made of insulating material and that carries on its opposite edge portions combined binding and trimming means. The binding means comprises an annular electrode 34 on the top of the tool, and an annular electrode 36 on the bottom of the tool. Each of these electrodes is electrically interconnected to the generator 24. The trimming means include an annular top cutter 37 and an annular bottom cutter 38, and each cutter is connected to an electrode and, for instance, may be integral therewith. The end portions of the top electrode 34 and of the top cutter 37, that are shown in Fig. 3, are illustrated in an enlarged detail view in Fig. 5.

Instead of using separate electrode and cutter, they may be united to form a single binding and trimming means, such as the modified tool 40 illustrated in Fig. 6. The tool 40 which, like the tool 26, can either have a single or two opposite operating edges, includes a surface 39 that is inclined inwardly of the tool and carries out the binding part of the operation, and a substantially straight surface 41 that intersects the inclined surface 39 at the cutting edge 42 for the trimming part of the operation.

A further embodiment of the tool is illustrated in Fig. 7. The modified tool 43 comprises an electrode 44 which is similar to the electrode 34 of Figs. 3 and 5, and a cutter 46 that is secured to the electrode 44 and may be integral therewith. Similar to the earlier described cutter 37, the modified cutter 46 projects beyond the free end of the electrode to which it is attached; however, the cutter 46, furthermore, is offset laterally from the end of the electrode 44 and forms therewith a recess 47. The purpose of this recess is to enable the material during the sealing and trimming operation to flow thereinto for forming a ridge 48 as shown in Fig. 8.

The operation of the apparatus and parts described is as follows.

The bottom walls 12 and 13 of the receptacle may be formed by stamping or cutting from sheet material. The side wall 14 may be cut from tubular material, or prepared by fusing or other sealing from rectangular rolled-up sheet material.

The bottom wall 13 is then placed inside the guides 25 on the top surface of the platen 23. The side wall 14 is provided with the aperture 21 and the slide fastener 22, and is mounted on the tool 26, the latter having been moved away from the platen 23, and the mounting of the side wall being completed by bending the end portions 27 thereof over the top and bottom contours of the tool 26. The top wall 12 is either placed atop the side wall 14 that is held on the tool 26 and maintained thereon by its own stiffness, or by spacers (not shown), or is mounted on the underside of the plate 29 by means of the brackets 32 thereon.

The tool 26, carrying the side wall 14, may be lowered in registry onto the positioned bottom wall 13 either manually, or be guided into position by means of the guide 28. The plate 29 is then guided into registry position by the guide 31. The top portion of the side wall 14 is thus put in lamination superposition with the outer portion of the top wall 12, and similarly the bottom portion of the side wall 14 with the outer portion of the bottom wall 13.

Thereafter, a pressure mechanism (not shown in detail), indicated by the arrow 51, is actuated to press the plate 29 downwardly in a direction towards the platen 23. This actuation may be timed with the actuation of the generator 24, preferably automatically as is well-known to those familiar with this art.

By this pressure movement of the plate 29, the plate 29 and the platen 23 press the end portions of the walls against the edges of the tool 26. During this pressure movement, high frequency electric current fed from the generator 24 to the plate 29, to the platen 23 and to the electrodes 34 and 36, will induce heat in the end portions of the sheet material walls 12, 13 and 14. The electrodes 34 and 36 will penetrate into the superposed wall portion laminations adjacent thereto and fuse the same, while the cutters 37 and 38 will cut throughout a major part of the combined thickness of the assembly of superposed laminations of the wall material.

The pressure movement is so controlled, that it will terminate before the cutters 37 and 38 completely pierce the laminations. Complete piercing must be avoided, in order to prevent arcing between the electrode and the plate or platen opposite thereto.

Thereafter, the plate 29 is raised, and the assembled wall enclosure structure removed from its emplacement in the apparatus. Owing to incomplete piercing of the material by the cutters, the end portions of the walls still adhere to the structure. They are thereafter torn off, along the broken lines 52 shown in Figs. 5, 6 and 7, to complete the "tear seal" operation. Subsequently, the enclosure structure is turned inside out, by way of the open slide fastener 22, resulting in the finished receptacle shown in Figs. 1 and 2.

During the pressure movement of the top plate 29, that part of the material which is displaced by the entry of the tool edge will form a ridge along the sides of tool entry, as shown at 53 and 54 in Figs. 5–7. As shown in Fig. 8, in the immediate vicinity of the electrode the material of the laminations will be so fused that it substantially unites as illustrated at 56. Opposite the ridge 53 the laminations will be forced apart forming a narrow cavity 57.

As best shown in Fig. 8, the ridges left by the impression of the tool 43 are graceful in appearance while promoting strong wearing characteristics of the sealed receptacle.

Reference is being had to our co-pending application, Ser. No. 319,862 filed November 12, 1952.

In the preceding description, the apparatus and receptacle are for a cylindrical shape. However, rectangular or other shapes lend themselves equally well for treatment in accordance with the described method and means, and the modifications of the wall parts and tool necessary therefor are within the scope of the invention, save as limited by the claims hereof, and are simple to design. If necessary, the tool 26 may be made of more than one part, for instance by uniting several parts thereof, as indicated by bolt and nut assemblies numbered 58 in Fig. 3.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

Having thus described the invention, what we claim as new and desire to be secured by Letters Patent, is as follows:

1. In a method of binding and trimming cover material on tubular material, all material having thermoplastic surface characteristics, the steps comprising, bending the opposite outer endless edges of said tubular material, superposing on each endless edge a cover, whereby there will be two multiple layers spaced from each other, each layer being disposed near an end of said tubular material, subjecting both of said spaced multiple layers simultaneously to the same pressure and to heat for binding the same, and exerting pressure of the same magnitude to both layers for cutting simultaneously into the laminations formed by said layers to a predetermined fractional layer depth.

2. In a method of binding and trimming two spaced covers of a material on a piece of material located between said covers, all said material having thermoplastic surface characteristics, the steps comprising, bending outwardly the opposite outer edges of said piece, superposing on each edge a cover, whereby a cover will form a layer with the outward turned edge at each end of said piece, said layers being spaced from each other for the length of the piece therebetween, applying the same amount of pressure simultaneously to both layers, and applying simultaneously to both layers heat, for binding the laminations of each layer, and cutting into each layer to a predetermined fractional layer depth.

3. In a method, as claimed in claim 2, said piece having tubular form, the application of pressure and heat taking place outside the orbit of the tubular material between said layers.

4. In a method of binding and trimming cover material on tubular material, all material having thermoplastic surface characteristics, the steps comprising, bending the opposite outer endless edges of said tubular material, superposing on each endless edge a cover, whereby there will be two multiple layers spaced from each other, each layer being disposed near an end of said tubular material, applying pressure from the exterior against each layer and simultaneously between said layers, whereby both layers will be subjected to the same amount of pressure as the pressure exerted against one layer is taken up by the other, and applying heat, to bind the lamination of each layer, and cutting through each layer to a predetermined fractional layer depth.

References Cited in the file of this patent

UNITED STATES PATENTS

| Number | Name | Date |
|---|---|---|
| 1,584,370 | Green | May 11, 1926 |
| 1,766,787 | Kendrick | June 24, 1930 |
| 2,446,623 | Welch, Jr. | Aug. 10, 1948 |
| 2,510,383 | Dalgleish | June 6, 1950 |
| 2,517,672 | Jenkins | Aug. 8, 1950 |
| 2,525,356 | Hoyler | Oct. 10, 1950 |
| 2,560,566 | Graves et al. | July 17, 1951 |
| 2,589,777 | Collins | Mar. 18, 1952 |
| 2,631,646 | Gannon et al. | Mar. 17, 1953 |

FOREIGN PATENTS

| Number | Country | Date |
|---|---|---|
| 664,128 | Great Britain | Jan. 2, 1952 |